United States Patent Office 2,708,676
Patented May 17, 1955

2,708,676

PRODUCTION OF TRI-N-BUTYL ACONITATE

Claude Baggett, Jr., Lake Jackson, and John H. Brown, Jr., Freeport, Tex., assignors to The Dow Chemical Company, Midland, Mich., a corporation of Delaware No Drawing. Application October 18, 1950,
Serial No. 190,872

2 Claims. (Cl. 260—485)

This invention relates to the production of tri-n-butyl aconitate, and, more particularly, to an improved method for converting alkaline earth aconitates thereto.

Tri-n-butyl aconitate has special utility as a plasticizer with certain synthetic resins. For such use, however, it must be substantially free of impurities having a deleterious effect on the color or properties of the finished resin. Accordingly, the compound has hertofore been produced for this purpose from carefully purified aconitic acid.

The present invention is based upon the discovery that it is possible to produce tri-n-butyl aconitate suitable for use as a plasticizer by a relatively simple method that employs a crude alkaline earth aconitate as the starting material, and does not require the isolation or purification of aconitic acid.

According to the invention tri-n-butyl aconitate is produced from a crude alkaline earth aconitate, preferably from the crude form of a mixed calcium-magnesium aconitate. As the first step the aconitate is mixed with at least the stoichiometrical quantity of a strong aqueous mineral acid, and the resulting mixture is maintained at a temperature not higher than about 70° C. at least until reaction between the aconitate and the acid is substantially complete. In some instances a relatively heavy precipitate remains after reaction between the aconitate and the acid; when this is the case, the precipitate is separated from the aqueous solution before further treatment of the latter. The aqueous solution so produced is then extracted in the second step with n-butyl alcohol, and the n-butyl alcohol phase is separated from the aqueous phase. In the third step an esterification catalyst is added to the butyl-alcohol phase from step 2, and the mixture which results is heated to produce tri-n-butyl aconitate. Water and n-butyl alcohol are separated in the fourth step from the tri-n-butyl aconitate formed in step (3). The remaining tri-n-butyl aconitate is then purified in the fifth step by fractional distillation.

The crude alkaline earth aconitate that is used in carrying out step (1) of the process of the invention can be any one that is available; mixed calcium-magnesium aconitates are preferred because of their ready availability. Similarly, at least the stoichiometrical quantity of any strong aqueous mineral acid can be used; preferably, from about a 10 to about a 25 per cent excess over the stoichiometrical amount is employed. Aqueous sulfuric acid and hydrochloric acid are preferred acids because of their availability and relatively low cost.

The mixture of the alkaline earth aconitate and the strong aqueous mineral acid is maintained under such conditions that free aconitic acid is released (e. g., at a temperature of at least about 25° C. until reaction between the aconitate and the acid is substantially complete, conveniently for at least about one hour), but an unduly high temperature during this portion of the process results in the production of finished tri-n-butyl aconitate too highly colored for use as a plasticizer (i. e., it is desired that the temperature not exceed 70° C.; preferably the temperature does not exceed 50° C.). So long as a relatively low temperature is used at this stage of the reaction no undesirable effect results from an extended reaction time; accordingly, the maximum reaction time is determined by practical considerations, but is usually not longer than about five hours. If a comparatively heavy precipitate remains after reaction has proceeded in the mixture of the alkaline earth aconitate and the strong aqueous mineral acid (e. g., if the acid is sulfuric) this precipitate is advantageously separated from the solution before proceeding with the rest of the process. If only a light precipitate remains (e. g., if the aqueous acid is hydrochloric) the separation thereof prior to carrying out the rest of the process is not essential.

Decolorizing carbon is advantageously used in step (1) of the process of the invention. It is conveniently added to the alkaline earth aconitate before the acid treatment is started, or it can be added after the acid. The decolorizing carbon, when used, is separated from the aqueous solution before step (2) (the butanol extraction) is begun. The color of the finished tri-n-butyl aconitate is improved by such a practice.

It is usually desired, in carrying out the n-butanol extraction of the second step of the process of the invention, to remove from the aqueous solution of step (1) at least a major portion of the butyl alcohol-soluble material. To this end it is preferred that a total of from one to seven volumes of butyl alcohol per volume of aqueous solution be used, and at least three stages. The three or more stages can be provided by a batchwise operation, using a proportionate part of the alcohol for each stage, or by a continuous, countercurrent operation, the latter being preferred. Most desirably, a continuous operation employs from one to five volumes of butyl alcohol per volume of the aqueous solution, and a batchwise operation a total of from three to seven volumes per volume. It is to be understood, however, that the process of the invention may be carried out so as to extract only a minor amount of the n-butyl alcohol soluble material from the aqueous solution of step (1); such a procedure would be economically feasible if other use were made of the organic material remaining in the aqueous solution (e. g., if pure aconitic acid were produced therefrom). When the extraction of step (2) has been carried to the desired extent, the butyl alcohol phase is separated from the aqueous phase.

According to a preferred embodiment of the invention, the n-butanol extract from step (2) is passed over a cation exchange resin in the acid form before step (3) is carried out. Such treatment is not essential to the method of the invention, but improves the color of the finished tri-n-butyl aconitate.

Any of the conventional esterification catalysts can be employed in the usual amounts in carrying out step (3) of the process of the invention. The desired tri-n-butyl aconitate is conveniently formed by heating the mixture that results. Water and n-butanol are then separated from tri-n-butyl aconitate as the fourth step of the process of the invention. This separation is readily effected by fractionation, which can conveniently be carried out at atmospheric pressure; however, it is important to avoid heating the ester, in the course thereof, at a temperature higher than about 150° C. Otherwise, no particular care is required in the course of the separation.

According to a preferred embodiment of the invention the heating of step (3) is carried out in the still of a fractionating column, and the n-butyl alcohol-water azeotrope is distilled from the top of the column during the course of the esterification. When this preferred procedure is employed, steps (3) and (4) are carried out simultaneously. Most desirably this distillation is continued until substantially all of the unreacted butyl alcohol is distilled; this is readily accomplished by continuing heating until the still temperature reaches approximately 150° C. Pure tri-n-butyl aconitate is then recovered by fractionating the liquid remaining in the still. It is essential that the temperature of the esterification mixture not be allowed to exceed 150° C. in order to avoid coloration of the product.

The fifth step of the process of the invention involves the purification of the tri-n-butyl aconitate by fractional distillation, which is advantageously carried out at reduced pressure in order to avoid over-heating and consequent coloration. Otherwise, no particular precautions are required for this step of the process.

Steps (1), (2), (3) and (4) of the method of the invention are conveniently carried out at atmospheric pressure.

The following example illustrates a preferred embodiment, but is not to be construed as limiting the invention.

EXAMPLE

1. *Acidification*

A 1200 gram sample of a crude calcium-magnesium aconitate (assay: 720 grams of aconitic acid) and 120 grams of decolorizing carbon were treated stepwise with 6 N sulfuric acid (a total of about 1050 cc.); the reaction vessel was cooled after each acid addition to prevent heating the solution above about 35° C. When the acid addition was complete, the solution was stirred for about one hour, and precipitated calcium sulfate was filtered from the solution. The filter cake was re-slurried with a small amount of water, and the slurry re-filtered; this procedure was repeated twice to assure the maximum final recovery of tri-n-butyl aconitate.

2. *Butanol extraction*

The filtrate from the previous step and about 3½ liters of n-butanol were added to a two-gallon bottle, which was then stoppered and spun at 60 R. P. M. for 2½ hours. The butanol phase was separated from the aqueous phase which was then re-extracted three times in a similar manner, using fresh butanol for each extraction, and the four butanol extracts were combined.

3. *Esterification and dehydration*

The combined butanol extract from step (2) and 1 cc. of concentrated sulfuric acid were added to the still of a 25 plate fractionating column. The liquid in the still was heated; first, the n-butyl alcohol-water azeotrope, and then n-butyl alcohol were removed from the top of the column. Heating of the material in the still was discontinued when the temperature thereof reached 130° C.

4. *Purification*

The material remaining in the still at the end of step (3) was treated with decolorizing carbon (about 100 grams), and the carbon was then separatel by filtration. The filtrate was fractionated under reduced pressure on a short path still, and pure tri-n-butyl aconitate was recovered at 2 mm. Hg and 121° C. hot wall temperature. The material so produced had a refractive index ($n_D^{25}$) of 1.4540, and has been found to be satisfactory for use as a plasticizer with synthetic resins, even to make white compositions.

Substantially the same results have been achieved by carrying out a procedure similar to that described above, except that hydrochloric acid was the mineral acid used for the acidification step.

We claim:

1. A method of producing tri-n-butyl aconitate that comprises (1) forming a mixture consisting of an alkaline earth aconitate with at least 10 percent excess of the stoichiometrical quantity of a strong aqueous mineral acid, maintaining the mixture at a temperature of 25° to 50° C. until reaction between the aconitate and the acid is substantially complete, and separating any appreciable amount of precipitate formed from the resulting solution; (2) extracting the aqueous solution from step (1) with a solvent consisting of n-butyl alcohol in at least three stages, using a total of from one to seven volumes of butyl alcohol per volume of aqueous solution, and separating the butyl alcohol phase from the aqueous phase; (3) adding an esterification catalyst to the thus treated combined butyl alcohol phase and heating to boiling under fractionating conditions the resulting mixture to drive off first the n-butyl alcohol-water azeotrope and then substantially all the butyl alcohol while maintaining the temperature below 150° C.; and (4) fractionating the liquid remaining to recover pure tri-n-butyl aconitate.

2. A method of producing tri-n-butyl aconitate that comprises (1) forming a mixture consisting of an alkaline earth aconitate with at least the 10 percent excess of the stoichiometrical quantity of a strong aqueous mineral acid, maintaining the mixture at a temperature of 25° to 50° C. until reaction between the aconitate and the acid is substantially complete, and separating any appreciable amount of precipitate formed from the resulting solution; (2) extracting the aqueous solution from step (1) with a solvent consisting of n-butyl alcohol in at least three stages, using a total of from one to seven volumes of butyl alcohol per volume of aqueous solution, and separating the butyl alcohol phase from the aqueous phase; and passing the n-butyl alcohol phase over a cation-exchange resin in the acid form; (3) adding an esterification catalyst to the thus treated combined butyl alcohol phase and heating to boiling under fractionating conditions the resulting mixture to drive off first the n-butyl alcohol-water azeotrope and then substantially all the butyl alcohol while maintaining the temperature below 150° C.; and (4) fractionating the liquid remaining to recover pure tri-n-butyl aconitate.

References Cited in the file of this patent

UNITED STATES PATENTS

| Number | Name | Date |
|---|---|---|
| 2,062,917 | Lawson | Dec. 1, 1936 |
| 2,359,537 | Ventre | Oct. 3, 1944 |
| 2,434,300 | Weisberg et al. | Jan. 13, 1948 |
| 2,475,629 | Meincke | July 12, 1949 |
| 2,572,018 | Evans | Oct. 23, 1951 |
| 2,645,658 | Reeves | July 14, 1953 |

FOREIGN PATENTS

| 415,472 | Great Britain | Aug. 27, 1934 |